(12) United States Patent
Schiff

(10) Patent No.: US 6,298,242 B1
(45) Date of Patent: Oct. 2, 2001

(54) METHOD AND APPARATUS FOR REDUCING FRAME ERROR RATE THROUGH SIGNAL POWER ADJUSTMENT

(75) Inventor: Leonard N. Schiff, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/358,997

(22) Filed: Jul. 22, 1999

(51) Int. Cl.$^7$ ........................................... H04B 7/00
(52) U.S. Cl. .................................... 455/522; 455/69
(58) Field of Search ................ 455/69, 522, 67.1, 455/67.3, 67.4, 67.5, 115

(56) References Cited

U.S. PATENT DOCUMENTS

| | | | |
|---|---|---|---|
| 4,742,533 | 5/1988 | Weidner et al. | 375/331 |
| 4,742,561 | * 5/1988 | Tipton | 455/67.2 |
| 5,193,094 | 3/1993 | Viterbi | 714/795 |
| 5,241,690 | * 8/1993 | Larsson et al. | 455/522 |
| 5,414,730 | 5/1995 | Lundquist et al. | 375/150 |
| 5,574,984 | 11/1996 | Reed | 455/69 |
| 5,596,570 | * 1/1997 | Soliman | 370/252 |
| 5,675,581 | * 10/1997 | Soliman | 370/252 |
| 5,710,981 | * 1/1998 | Kim et al. | 455/69 |
| 5,751,739 | 5/1998 | Seshadri et al. | 714/746 |
| 5,878,329 | * 3/1999 | Mallinckrodt | 455/522 |
| 6,055,415 | * 4/2000 | Suzuki | 455/522 |
| 6,101,179 | * 8/2000 | Soliman | 370/342 |
| 6,108,561 | * 8/2000 | Mallinckrodt | 455/522 |
| 6,137,994 | * 10/2000 | Alterman et al. | 455/69 |
| 6,144,860 | * 11/2000 | Komatsu | 455/522 |
| 6,144,861 | * 11/2000 | Sundelin et al. | 455/522 |

FOREIGN PATENT DOCUMENTS

| | | | |
|---|---|---|---|
| 0462952 | 12/1991 | (EP) | H04B/7/005 |
| 9637972 | 11/1996 | (WO) | H04B/7/005 |

* cited by examiner

Primary Examiner—William Trost
Assistant Examiner—Rafael Perez-Gutierrez
(74) Attorney, Agent, or Firm—Philip R. Wadsworth; Gregory D. Ogrod

(57) ABSTRACT

A method and apparatus for controlling a signal transmission power. The method of the present invention includes the steps of demodulating a received signal to produce a demodulated signal and distorting the demodulated signal to produce a distorted demodulated signal. The demodulated signal can be distorted by, for example, adding noise. A signal quality measurement, such as signal-to-noise ratio, is then determined based on the distorted demodulated signal rather than the demodulated signal. An adjustment in the transmission power is then requested based on the signal quality measurement of the distorted demodulated signal.

35 Claims, 9 Drawing Sheets

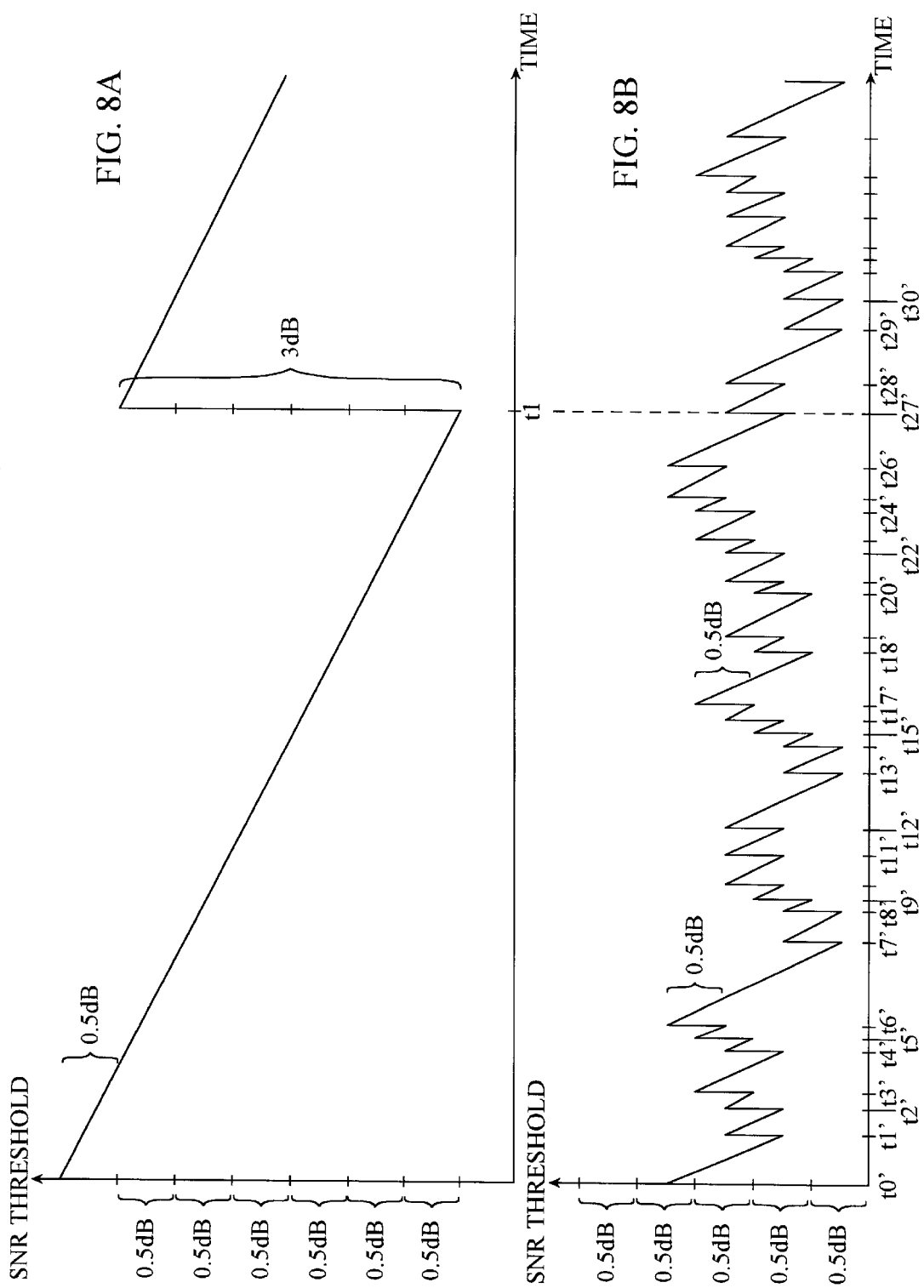

METHOD AND APPARATUS FOR REDUCING FRAME ERROR RATE THROUGH SIGNAL POWER ADJUSTMENT

BACKGROUND OF THE INVENTION

I. Field of the Invention

The present invention relates generally to a wireless communication system, and more specifically, to a method and apparatus for reducing frame error rate (FER) in a wireless communications system.

II. Related Art

When delivering data over a wireless link that has a relatively poor FER (for example, greater than 1%), many methods of retransmitting data exist for achieving as low a FER as a data service demands. For example, a cyclic redundancy check (CRC) can be performed at a receiving end of a link to check the integrity of a block of data. CRC is a well known method of establishing that data was correctly received in data communications. A CRC character is generated at a transmitting device and appended to a data block. The receiving end makes a similar calculation and compares its results with the added CRC character. If there is a difference, the receiving end requests retransmission of the data block.

For example, the use of protocols such as Automatic Retransmission reQuest (ARQ) can be used for retransmission of data blocks. In ARQ, the transmitting device encodes an error-detection field (for example, a CRC field) based on the contents of a data block. The receiving end recalculates the check field and compares it with that received. If they match, an acknowledgment (ACK) is transmitted back to the transmitting device. If they don't match, a negative acknowledgment (NAK) is returned, and the transmitting device retransmits the message.

The above discussed method is satisfactory for transmitting many types of data. However, these methods of achieving low FER cause increased latency due to the retransmission of data blocks. Such increased latency is not acceptable when transmitting certain types of data, such as real time digitized voice, or any other type of latency sensitive data. More specifically, the retransmission of data blocks causes delay times that are both higher on average and have greater variance than the requirements for many latency sensitive systems.

What is needed is a method and apparatus for delivering data having low FER without having increased latency. In other words, there is a need for a method and apparatus for reducing FER without relying on the retransmission of data blocks.

SUMMARY OF THE INVENTION

The present invention is directed toward a method and apparatus for controlling a signal transmission power. The method of the present invention includes the steps of demodulating a received signal to produce a demodulated signal and distorting the demodulated signal to produce a distorted demodulated signal. The demodulated signal can be distorted by, for example, adding noise. A signal quality measurement, such as signal-to-noise ratio, is then determined based on the distorted demodulated signal rather than the demodulated signal. An adjustment in the transmission power is then requested based on the signal quality measurement of the distorted demodulated signal.

In one embodiment of the present invention, the determined signal quality measurement is compared to a threshold and an adjustment in the transmission power is then requested based on the results of the comparison. The threshold represents a desired minimum signal quality level at which signals should be received. Some quality measurement functions, such as SNR, have values that are proportional to signal quality. That is, they increase with increasing quality and decrease with decreasing quality. Therefore, an increase in transmission power is requested if these signal quality measurements fall below the threshold, and a decrease in power can be requested if the signal quality measurements exceed the threshold. Other functions, based on error events, have values that are inversely proportional to signal quality, and decrease in value with increased signal quality and visa versa. In this situation, a decrease in transmission power is requested if the measurement falls below the threshold, and an increase in power is requested if the measurement exceeds the threshold.

In one embodiment, the method of the present invention further includes the steps of decoding the demodulated signal to produce decision data and decoding the distorted demodulated signal to produce distorted decision data. A second signal quality measurement or a measure of "error events," is then determined based on said distorted decision data (rather than the decision data). The threshold, used in determining whether to increase or decrease transmission power, is adjusted based on the second signal quality measurement.

In one embodiment where the signal is transmitted by a base station and received by a user terminal, the steps of the present invention are performed by the user terminal, and the transmission power at the base station is being controlled.

In another embodiment where the signal is transmitted by a gateway and received by a user terminal using a satellite, the steps of the present invention are performed by the user terminal, and the transmission power of the gateway is being controlled.

In still another embodiment where the signal is transmitted by a user terminal and received by a base station, it is the transmission power at the user terminal that is being controlled.

In a further embodiment, the signal is transmitted by a user terminal and received by a gateway via a satellite, the steps of the present invention are performed by the gateway, and the transmission power of the user terminal is being controlled.

BRIEF DESCRIPTION OF THE DRAWINGS

The features, objects, and advantages of the present invention will become more apparent from the detailed description set forth below when taken in conjunction with the drawings in which like reference characters identify the same or similar elements throughout and wherein:

FIG. 8A illustrates the SNR threshold, over time, for a user terminal which uses the power control scheme of FIG. 4A; and FIG. 8B illustrates the SNR threshold, over time, for a user terminal which uses the power control scheme of FIG. 4B.

DETAILED DESCRIPTION OF THE PREFERRED EMBODIMENTS

Figure 1:
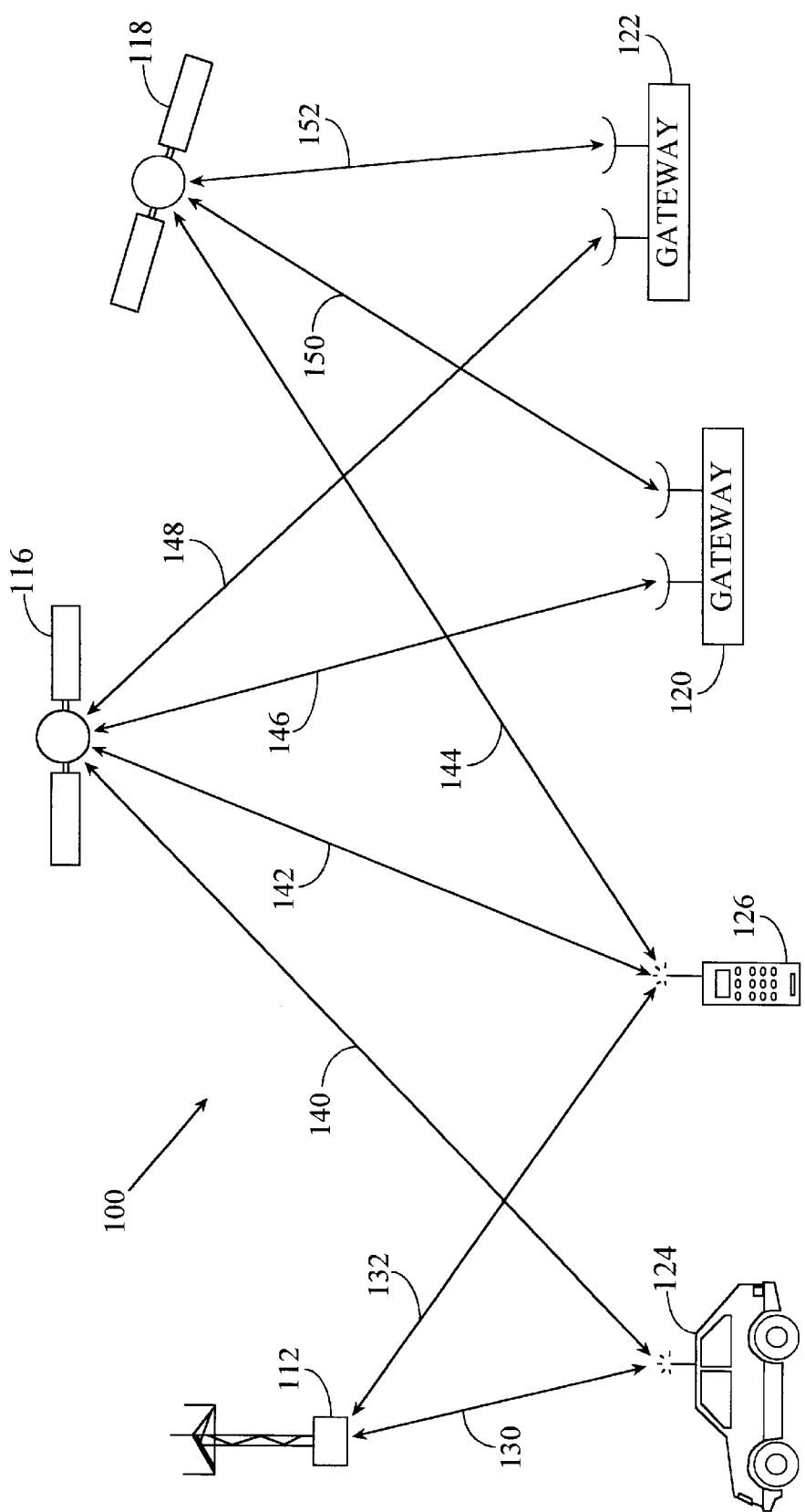
FIG. 1 illustrates a typical communications system in which the present invention is useful.

The preferred embodiment of the invention is discussed in detail below. While specific steps, configurations, and arrangements are discussed, it should be understood that this is done for illustrative purposes only. A person skilled in the relevant art will recognize that other steps, configurations, and arrangements can be used without departing from the spirit and scope of the present invention.

I. Example Environment

Before describing the invention in great detail, it is useful to describe an example environment in which the invention can be implemented. The present invention can be implemented in many wireless communication systems, especially one in which it is desirable to control the amount of power used to transmit a signal. Such environments include, without limitation, satellite and terrestrial cellular telephone systems. A preferred application is in code-division multiple access (CDMA) wireless spread spectrum communication systems for mobile or portable telephone service.

The present invention is particularly suited for use in communications systems employing Low Earth Orbit satellites. However, as would be apparent to one skilled in the relevant arts, the concept of the present invention can also be applied to other types of satellite and terrestrial communications systems.

Typical satellite-based communications systems use gateways, and one or more satellites to relay communications signals between the gateways and one or more user terminals. Gateways provide communication links from each user terminal to other user terminals or users of other connected communications systems, such as a public telephone switching network. Typical terrestrial systems use base stations to transmit a signal to and to receive a signal from a user terminal. The user terminals can be fixed or mobile, such as a mobile telephone.

Some satellite and terrestrial communications systems employ code division multiple access (CDMA) spread-spectrum signals, as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, which issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

In a typical spread spectrum communications system, one or more preselected pseudonoise (PN) code sequences are used to modulate or "spread" information signals over a predetermined spectral band prior to modulation onto a carrier signal for transmission as communications signals. PN code spreading, a method of spread spectrum transmission that is well known in the art, produces a signal for transmission that has a bandwidth much greater than that of the data signal. In a base station- or gateway-to-user communication link, PN spreading codes or binary sequences are used to discriminate between signals transmitted by different base stations or gateways, or over different beams, as well as between multipath signals.

In a typical CDMA spread spectrum system, channelizing codes are used to discriminate between signals intended for different users within a cell or between user signals transmitted within a satellite sub-beam on a forward link (i.e., the signal path from the base station or gateway to the user terminal transceiver). Each user transceiver has its own orthogonal channel provided on the forward link by using a unique "channelizing" orthogonal code. Signals transferred on these channels are generally referred to as "traffic signals." Additional channels are provided for "paging," "synchronization," and other signals transmitted to system users. Walsh functions are generally used to implement the channelizing codes, also known as Walsh codes.

CDMA spread-spectrum communications systems, such as disclosed in the above patent documents, contemplate the use of coherent modulation and demodulation for forward link user terminal communications. In communications systems using this approach, a "pilot" carrier signal, also referred to as a "pilot signal," is used as a coherent phase reference for forward link signals. That is, a signal which contains no data modulation is transmitted by a gateway or base station throughout a region of coverage as a reference.

Pilot signals are used by user terminals to obtain initial system synchronization and provide time, frequency, and phase tracking of other signals transmitted by the gateway or base station. Phase information obtained from tracking a pilot signal carrier is used as a carrier phase reference for coherent demodulation of other system signals or traffic (data) signals. This technique allows many traffic signals to share a common pilot signal as a phase reference, providing for a less costly and more efficient tracking mechanism. A single pilot signal is typically transmitted by each gateway or base station for each frequency used, referred to as a CDMA channel or sub-beam, and shared by all user terminals receiving signals from that gateway or base station on that frequency.

Gateways and base stations can convey information to user terminals using one or more signals known as paging signals that are transmitted on paging channels. For example, when a call has been placed to a particular mobile phone, the gateway alerts that mobile phone by means of a paging signal. Paging signals are used to designate the presence of a call, which traffic channel to use, and to also distribute system overhead information, along with user terminal specific messages. A communication system may have several paging channels. Synchronization signals can also be used to transfer system information useful to facilitate time synchronization. All of these signals act as shared resources in a manner similar to pilot signals.

User terminals can respond to a paging signal message by sending an access signal over a reverse link, (that is, the signal path from the user terminal to the base station or gateway transceiver). Access signals are also used by user terminals when they originate calls.

As with any communication system, the communication signals are received by the user terminal and downconverted into a baseband frequency for further processing. Once downconverted, the signals are processed digitally to detect the particular pilot signal or signals being received, and to demodulate associated paging, synchronization, and traffic signals. During demodulation, the PN spreading codes are applied to despread the signals and the channelizing codes correlated with the signals to provide data.

An exemplary wireless communication system in which the present invention is useful is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial and satellite based, although, this is not necessary. The total number of base stations, gateways, and satellites in such systems depend on desired system capacity and other factors well understood in the art.

User terminals 124 and 126 each have or comprise a wireless communication device such as, but not limited to, a cellular telephone, a data transceiver, or a paging or position determination receiver, and can be hand-held or vehicle mounted as desired. In FIG. 1, user terminal 124 is illustrated as a vehicle mounted device and user terminal 126 is illustrated as a hand-held mobile telephone. However, it is also understood that the teachings of the invention are applicable to fixed units where remote wireless service is desired. User terminals are sometimes also referred to as subscriber units, mobile stations, mobile units, or simply as "users" or "subscribers" in some communication systems, depending on preference.

Generally, beams from satellites 116 and 118 cover different geographical areas in predefined patterns. Beams at different frequencies, also referred to as CDMA channels or 'sub-beams,' can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations, including other orbital distances and constellations. At the same time, the invention is equally applicable to terrestrial based systems of various base station configurations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142 and 144. The gateway-satellite communication links, between gateways 120 and 122 and satellites 116 and 118, are illustrated by lines 146, 148, 150 and 152. These communication links may also be referred to as communication channels. Gateways 120 and 122, and base station 112, may be used as part of one- or two-way communication systems or simply to transfer messages or data to user terminals 124 and 126. In a preferred embodiment, gateways 120 and 122, and base station 112 are used as part of a two-way communications system.

Figure 2:
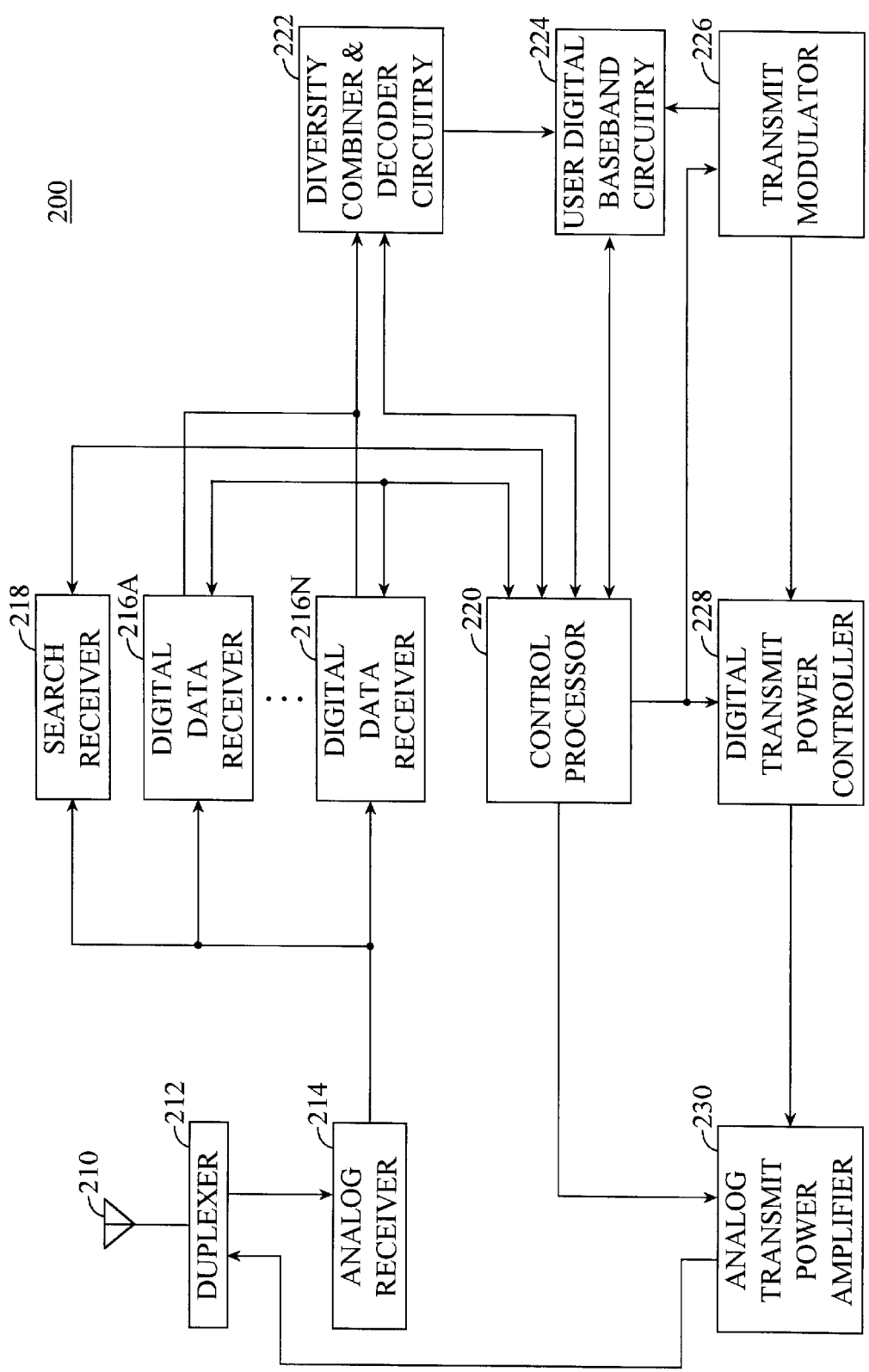
FIG. 2 illustrates an exemplary transceiver apparatus for use in a user terminal.

An exemplary transceiver 200 for use in a user terminal 124, 126 is illustrated in FIG. 2. Transceiver 200 uses at least one antenna 210 for receiving communication signals which are transferred to an analog receiver 214, where they are downconverted, amplified, and digitized. A duplexer element 212 can be used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of user terminal complexity, as would be apparent to one skilled in the relevant art. Digital data receivers 216A–216N are used for despreading and correlating the received signals addressed to the user terminal.

At least one user terminal control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of PN code sequences or orthogonal functions to be used for processing communication signal waveforms. Signal processing by control processor 220 can include a determination of relative signal strength and computation of various related signal parameters. Computations of signal parameters, such as timing and frequency, may include the use of additional or separate dedicated circuitry to provide increased efficiency or speed in measurements or improved allocation of control processing resources.

The outputs of digital data receivers 216A–216N are coupled to diversity combiner and decoder circuitry 222 within the user terminal. Digital data receivers 216A–216N provide demodulated user data such as digitized encoded speech to diversity combiner and decoder circuitry 222. Diversity combiner and decoder circuitry 222 combines the different signals from digital data receivers 216A–216N so as to provide a single user data signal. User digital baseband circuitry 224 also performs decoding and error correction on the user data.

The signal output from diversity combiner and decoder circuitry 222 is provided to digital baseband circuitry 224 for interface with the user. User digital baseband circuitry 224 comprises processing and presentation elements used to transfer information to and from a user terminal. That is, signal or data storage elements, such as transient or long term digital memory; input and output devices such as display screens, speakers, keypad terminals, and handsets; A/D elements, vocoders and other voice and analog signal processing elements; and the like, all form parts of the user terminal baseband circuitry 224 using elements well known in the art. Some of these elements may also operate under the control of, or in communication with, control processor 220.

When voice or other data is prepared as an output message or communications signal originating with the user terminal, user digital baseband circuitry 224 is used to receive, store, process, and otherwise prepare the desired data for transmission. User digital baseband circuitry 224 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway 120, 122 or base station 112.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 224. Alternatively, the information can be inserted as predetermined control bits by transmit modulator 226 or transmit power controller 228 under the control of control processor 220.

Digital receivers 216A–216N and searcher receiver 218 are configured with signal correlation elements to demodulate and track specific signals. Searcher receiver 218 is used to search for pilot signals, or other relatively fixed pattern strong signals, while digital receivers 216A–216N are used to demodulate other signals associated with detected pilot signals. Therefore, the outputs of these units can be monitored to determine the energy in or frequency of the pilot signal or other signals. These receivers also employ frequency tracking elements that can be monitored to provide current frequency and timing information to control processor 220 for signals being demodulated.

Additional details of digital data receivers 216A–216N, diversity combiner and decoder circuitry 222 and digital baseband circuitry 224, according to an embodiment of the present invention, are discussed below in the description of FIGS. 4A and 4B.

Figure 3:
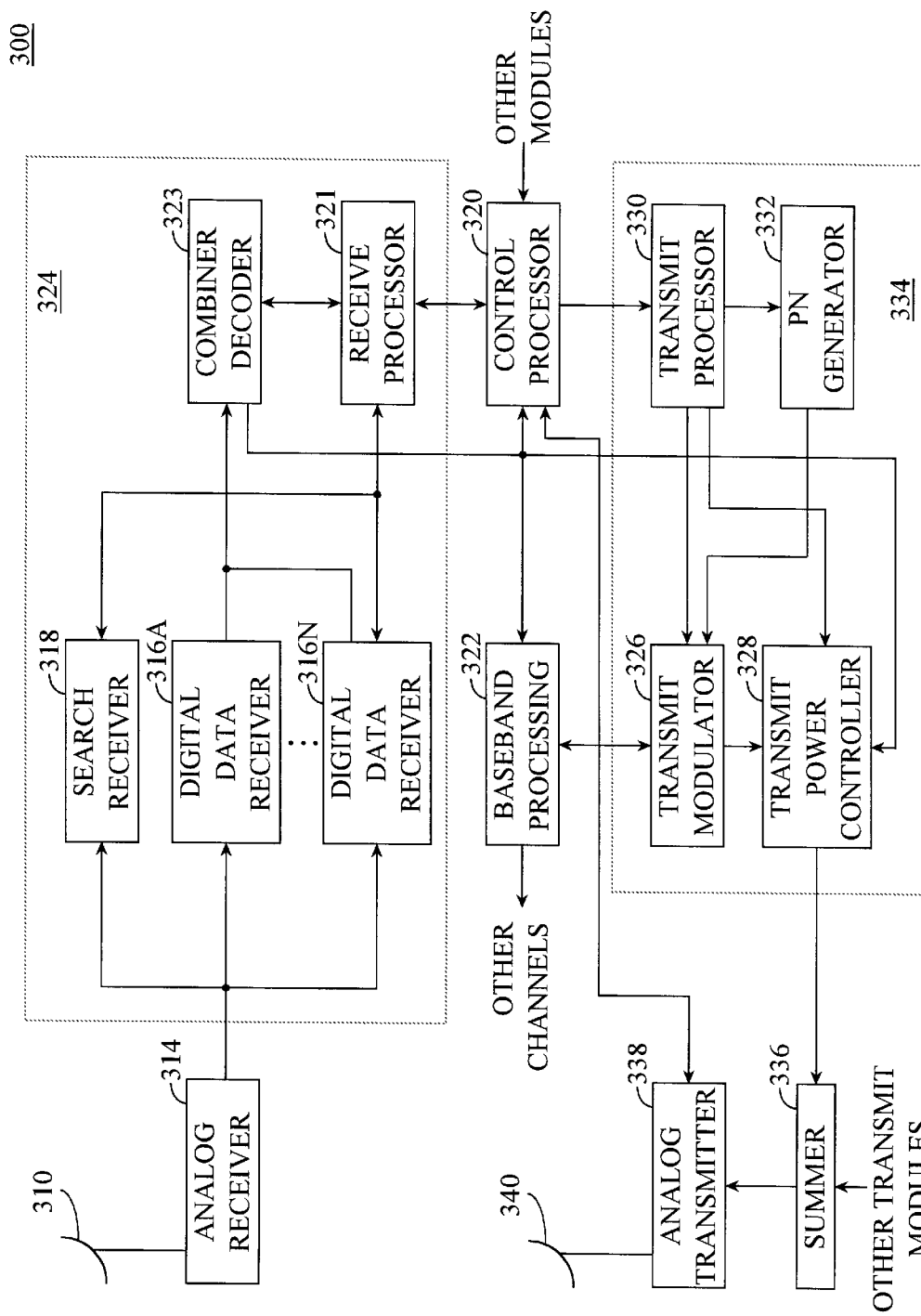
FIG. 3 illustrates an exemplary transmission and reception apparatus for use in a gateway.

An exemplary transmission and reception apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120, 122 and one user terminal 124, 126, although certain variations are known in the art. One analog receiver 314 can provide inputs for many digital receiver modules 324, and a number of such modules are typically used in gateways 120, 122 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals 124, 126 are each coupled to one or more appropriate transmit modules 334. A typical gateway 120, 122 uses a number of such transmit modules 334 to provide service to many user terminals 124, 126 at a time, and for several satellites and beams at a time. A base station 112 may also use a number of such modules, although base stations tend to group transmit and receive functions more closely together in modem structures. The number of transmission modules 334 used by gateway 120, 122 is determined by factors well known in the art, including system complexity, number of satellites in view, system user capacity, degree of diversity chosen, and the like.

Each transmit module 334 includes a transmit modulator 326 which spread spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 122, 124.

The output of transmit power controller 328 is transferred to a summer 336 where it is summed with the outputs from other transmit power control circuits. Those outputs are signals for transmission to user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to user terminals 124, 126. Antennas 310 and 340 may be the same antennas depending on the complexity and configuration of the system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in user communications.

Control processor 320 also controls the generation and power of pilot, synchronization, and paging channel signals and their coupling to transmit power controller 328. The pilot channel is simply a signal that is not modulated by data, and may use a repetitive unchanging pattern or non-varying frame structure type (pattern) or tone-type input to transmit modulator 326. That is, the orthogonal function, Walsh code, used to form the channel for the pilot signal generally has a constant value, such as all 1's or 0's, or a well known repetitive pattern, such as a structured pattern of interspersed 1's and 0's. If, as is usually the case, the Walsh code used is the all 0 code, this effectively results in transmitting only the PN spreading codes applied from PN generator 332.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, synchronization, paging signals, and traffic channel signals, and their respective coupling to power controller 328. Receiver processor 321 controls searching, PN spreading codes, and timing for demodulation and monitoring received power.

II. Transmission Power Control

Figure 4A:
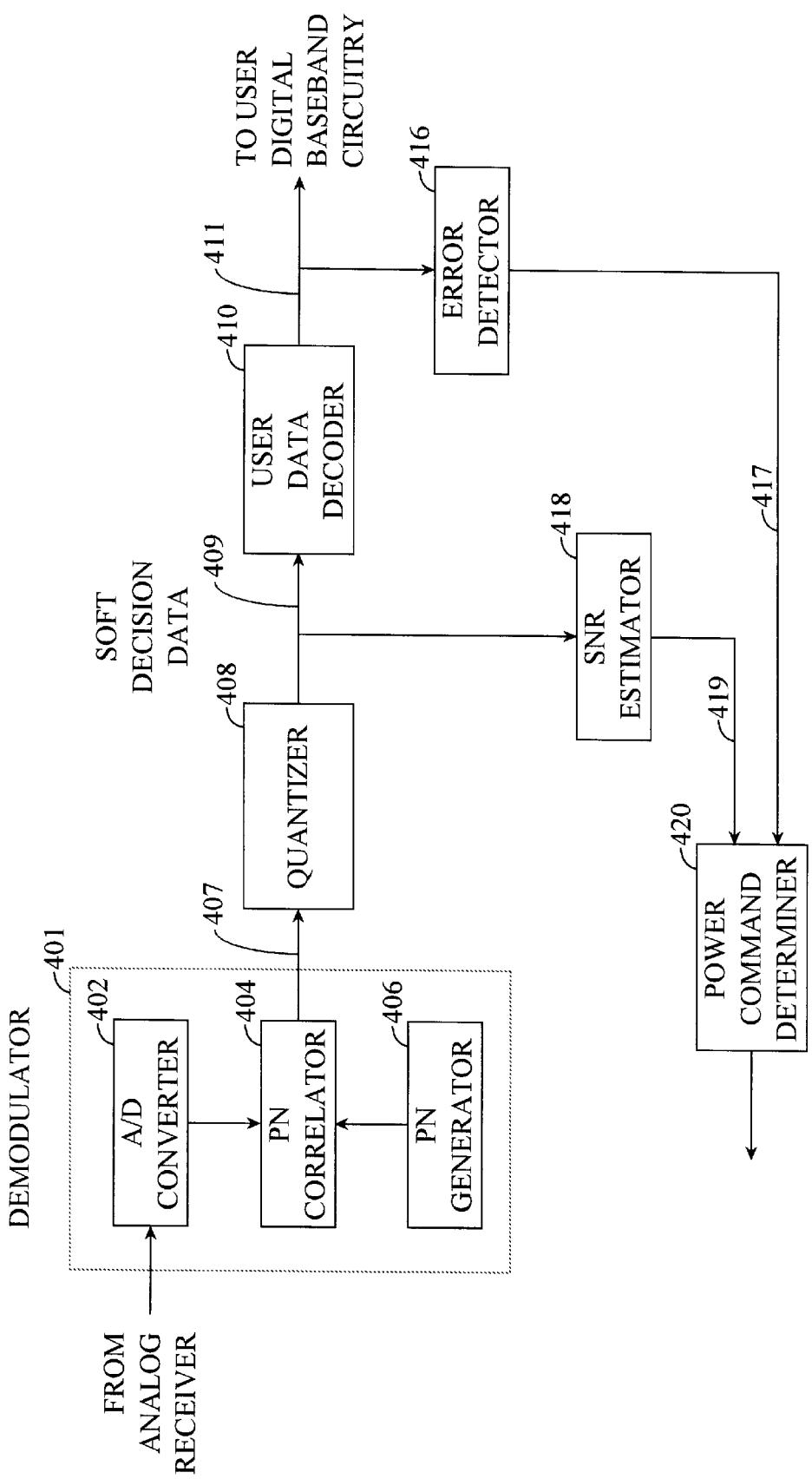
FIG. 4A is a block diagram of a power control scheme.

FIG. 4A illustrates details of a possible power control scheme of user terminal transceiver 200. A received signal is input into a demodulator 401. In one embodiment, demodulator 401 includes an A/D converter 402, a pseudo-random noise (PN) correlator 404 and a PN generator 406. The received signal is converted from analog to digital form by A/D converter 402. The digital signal output from A/D converter 402 is provided to correlator 404 where the signal undergoes a correlation process which compares the signal with a local reference for agreement. In the embodiment illustrated, correlator 404 is a PN correlator. Accordingly, the signal undergoes a correlation process with PN signals provided by PN generator 406. Output 407 of demodulator 401 is preferably provided to a quantizer 408. Output 409 of quantizer 408 (or output 407, if quantizer 408 is not used) can include soft decision data that corresponds to a measure of confidence that a particular group of sampled signals corresponds to a particular orthogonal code from within a set of orthogonal codes, generally implemented using Walsh codes. This output 409 of quantizer 408 (or output 407 directly) is provided to user data decoder 410 which provides user data to user digital baseband circuitry 224, which is described above. Decoder 410 uses maximum likelihood decoding techniques to generate estimated traffic channel data bits 411 (also referred to as user data). The maximum likelihood decoding techniques may be augmented by using an algorithm substantially similar to a Viterbi decoding algorithm, which is well known in the relevant art.

It is anticipated that the components of demodulator 401 and quantizer 408 are components of the digital data receiver 216 described above. Further, it is anticipated that components of decoder 410 are components of diversity combiner and decoder circuitry 222, described above.

The quality of the signal received at a user terminal, such as user terminal 126, is measured by the user terminal. From this measurement, the level of adequacy of the signal power is determined, where poor signal quality is an indication of insufficient signal power. For example, a signal-to-noise ratio (SNR) estimator 418 can estimate the SNR of the received signal based on output 409 of quantizer 408 (or output 407 directly). Alternatively, or additionally, signal quality can be measured based on errors such as frame errors. For example, an error detector 416 can determine, on a frame by frame basis, whether or not an error has occurred. Error detector 416 can detect frame errors using well known techniques such as, but not limited to, CRC bits or information.

The output of SNR estimator 418 and/or error detector 416 is provided to a power command determiner 420. Power command determiner 420 determines whether or not the transmitter power (used to transmit the received signal) should be adjusted based on the quality of the received signal. More specifically, power command determiner 420 can generate power-up or power-down commands which in-turn are used to generate power-up or power-down request messages that are sent from user terminal 126 to, for example, gateway 122. Once received at gateway 122, these power adjustment messages are provided to transmit processor 330 which in-turn causes transmit power controller 328 to increase or decrease the power of signals sent to user terminal 126.

Power command determiner 420 can request such adjustments of the transmitted signal power based on measurements of signal quality, such as SNR and/or frame errors. At a high level, power command determiner 420 compares signal quality measurements to signal quality thresholds. If a measured signal quality exceeds a corresponding threshold, power command determiner 420 can request that gateway 122 change its transmitted signal power by a specific amount, either increase or decrease, as desired. Additionally, if the measured signal quality does not exceed the threshold, power command determiner 420 can request that gateway 122 change its transmitted signal power by a specific amount in order to conserve power and decrease possible signal interference, either, decrease or increase, as desired.

More specifically, power command determiner 420 can determine adjustments in the transmitter power of gateway 122 based on measured SNR of the received signal using output 419 from SNR estimator 418. Accordingly, power command determiner 420 can determine that transmission power of gateway 122 should be increased by a predetermined amount if the SNR falls below a predetermined threshold or that transmission power should be decreased by a predetermined amount if the SNR is above the predetermined threshold.

Alternatively and/or additionally, power command determiner 420 can determine a FER of the received signal using the output 417 from error detector 416. Accordingly, power command determiner 420 can determine that transmitter power of gateway 122 should be increased by a predetermined amount if the FER is above a predetermined threshold (for example, 1%) or that power should be decreased by a predetermined amount if the FER is below the predetermined threshold.

Alternatively, as discussed in more detail below, power command determiner 420 can determine adjustments in transmission power based on comparisons between a measured/estimated SNR and a SNR threshold, and can adjust the SNR threshold based on whether or not the FER falls below or exceeds a predetermined FER threshold.

FER is a computation based on the number of frames received with errors compared to frames received without errors. SNR is a ratio of the usable signal being transmitted to the noise or undesired signal. The use of alternative measurements of signal quality such as the Bit Error Rate (BER) are also within the spirit and scope of the present invention.

For the example embodiments being discussed, references to adjustments (increases or decreases) of "transmitter power" or "transmission power" mean that gateway 122 adjusts the amount of power that it uses to send a signal(s) to a particular user terminal, such as user terminal 126. Additional details of power command determiner 420 are discussed below.

III. Preferred Embodiment

Figure 4B:
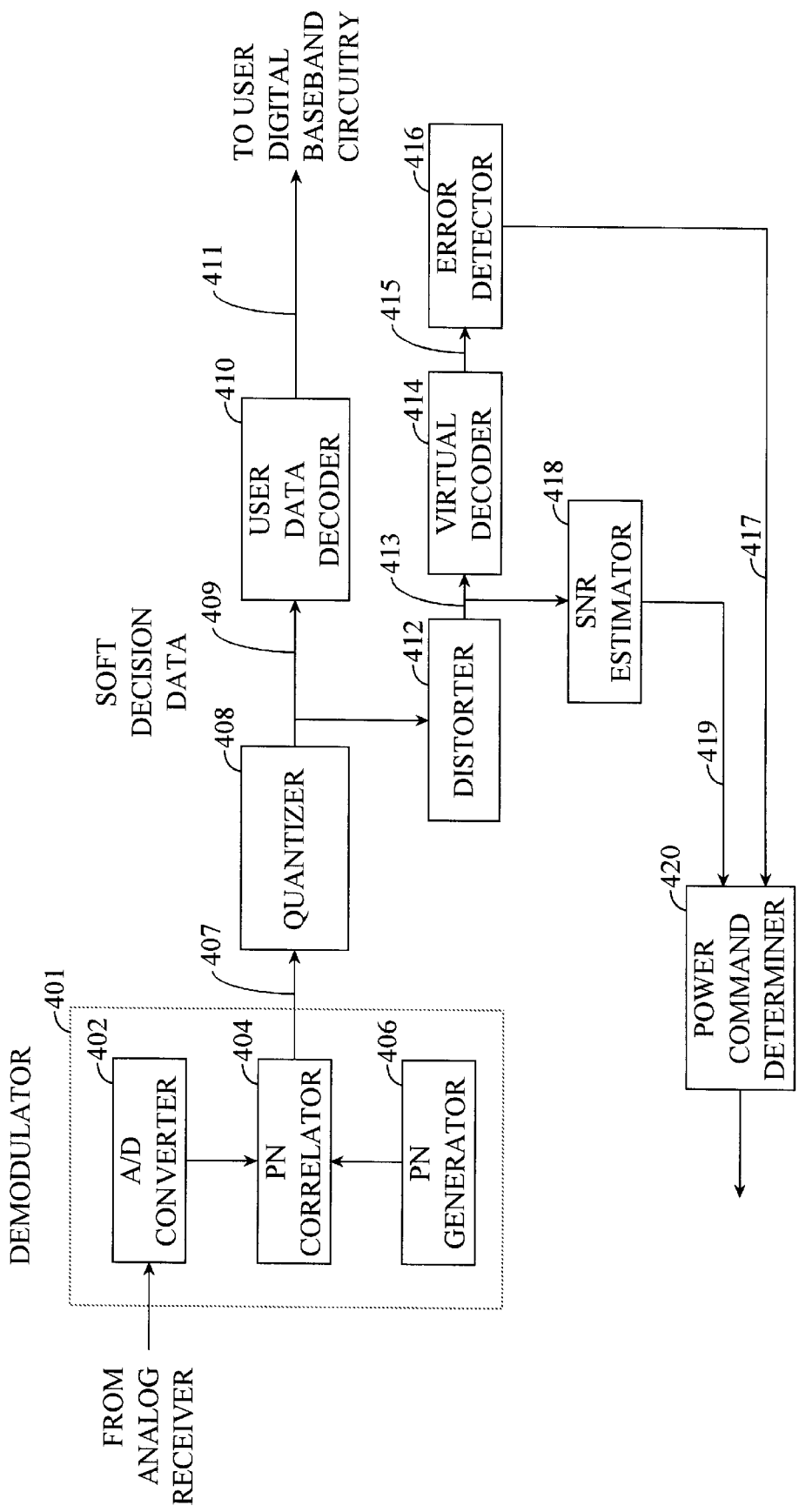
FIG. 4B is a block diagram of a power control scheme according to a preferred embodiment of the present invention.

FIG. 4B illustrates an alternative power control scheme according to a preferred embodiment of the present invention. The power control scheme illustrated in FIG. 4B is similar to the power control scheme of FIG. 4A in that it includes demodulator 401, quantizer 408 (preferably, but not necessarily), user data decoder 410, error detector 416 and/or SNR estimator 418, and power command determiner 420. However, the embodiment of FIG. 4B differs in a few significant ways. First, the power control scheme of FIG. 4B also includes a distorter 412 and a virtual decoder 414. Additionally, in this embodiment, the input to SNR estimator is output 413 of distorter 412, rather than output 409 of quantizer 408 (or output 407 directly). Further, the input to error detector 416 is output 415 of virtual decoder 414, rather than output 411 (user data) of user data decoder 410.

It is noted that user data decoder 410 and virtual decoder 414 can be physically distinct components. Alternatively, data decoder 410 and virtual decoder 414 can be a single decoder that is time multiplexed to function as two decoders.

Distorter 412 distorts output 409 of quantizer 408 (or output 407 directly) by adding, for example, pseudonoise to output 409. The effect of distorter 412 is to worsen output 409 of quantizer 408 (or output 407). For example, in the embodiment where output 409 of quantizer 408 is soft decision data, output 413 of distorter 412 is distorted soft decision data corresponding to levels of confidence that a particular group of sampled signals correspond to a particular orthogonal code. Due to distorter 412, the levels of confidence corresponding to output 412 are less/reduced as compared to output 409.

Referring to virtual decoder 414, the term "virtual" is used because the output of virtual decoder 414 is not user data which is provided to digital baseband circuitry 224. Output 411 from user data decoder 410 is still provided to digital baseband circuitry 224 in the same manner described above in the discussion of FIG. 4A. However, distorted output 415 of virtual decoder 414, rather than output 411 of user data decoder 410 (as in FIG. 4A), is used for power control. That is, error detector 416 determines errors based on output 415 of virtual decoder, rather than output 411. This causes the amount of errors detected to be higher than if error detector 416 determines errors based on the actual user data 411 (as in FIG. 4A).

Additionally, distorted output 413 is provided to SNR estimator 418. Because SNR estimator 418 is measuring/estimating the SNR of distorted data 413, the estimated SNR 419 provided to power command determiner 420 is lower/worse than the actual SNR of the output of quantizer 408 (that is, output 409).

In the embodiment of FIG. 4B, power command determiner 420 determines whether or not to request an adjustment in transmission power based on "false" signal quality measurements. That is, power command determiner 420 makes determinations based on inputs that indicate that the signal quality is worse than it actually is. For example, SNR estimator 418 will estimate that the SNR is lower when using the power control scheme of FIG. 4B as compared to when using the power control scheme of FIG. 4A. Additionally, because distorted data 413 is provided to virtual decoder 414, virtual decoder 414 will make more frame errors than user data decoder 410. Accordingly, error detector 416 will detect an increased amount of errors when used in the power control scheme of FIG. 4B as compared to when used in the scheme of FIG. 4A. Therefore, power command determiner 420 when used in power control scheme of FIG. 4B will determine that a threshold has been exceeded earlier than it would if used in the power control scheme of FIG. 4A (assuming the same threshold is used in both schemes). This will cause power control determiner 420 to generate power-up or -down commands prior to signal quality thresholds actually being reached for nondistorted demodulated signal 409 (or 407) and/or user data 411.

IV. Operation of Power Control Determiner

Power command determiner 420 can perform the power control features disclosed in U.S. Pat. application Ser. No. 09/164,384, filed Sep. 30, 1998, entitled "System and Method for Optimized Power Control" and U.S. Pat. application Ser. No. 09/183,388, filed Oct. 29, 1998, entitled "Variable Loop Gain in Double Loop Power Control Systems," both of which are assigned to the assignee of the present invention, and both of which are incorporated herein by reference. For the purpose of completeness, a description of how the present invention can be used in combination with features of the above referenced patent applications is provided in the discussion of FIGS. 5 and 6.

Figure 5:
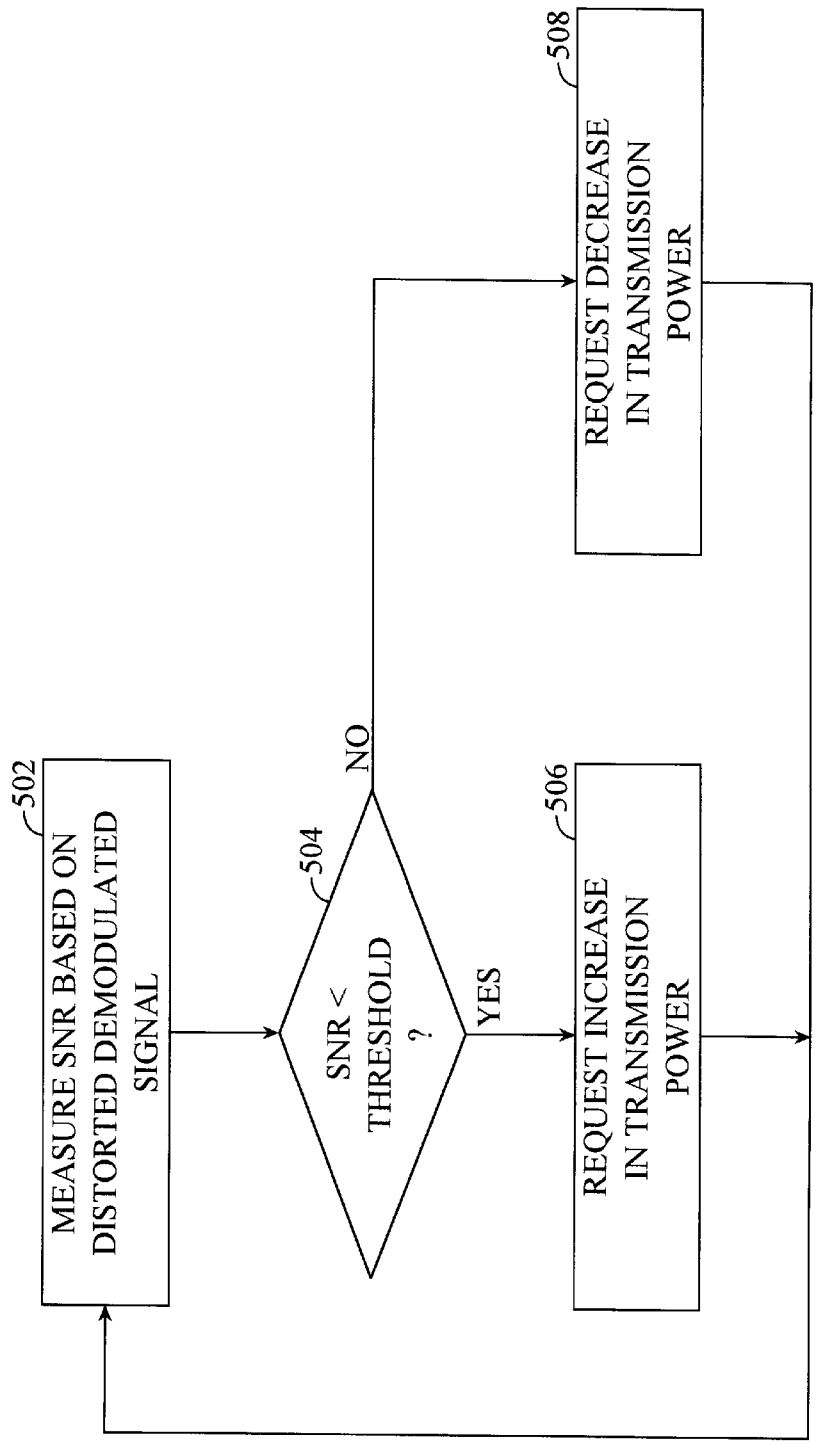
FIG. 5 is a flowchart depicting the operation of an inner power control loop used by a power control determiner in an embodiment of the present invention.
Figure 6:
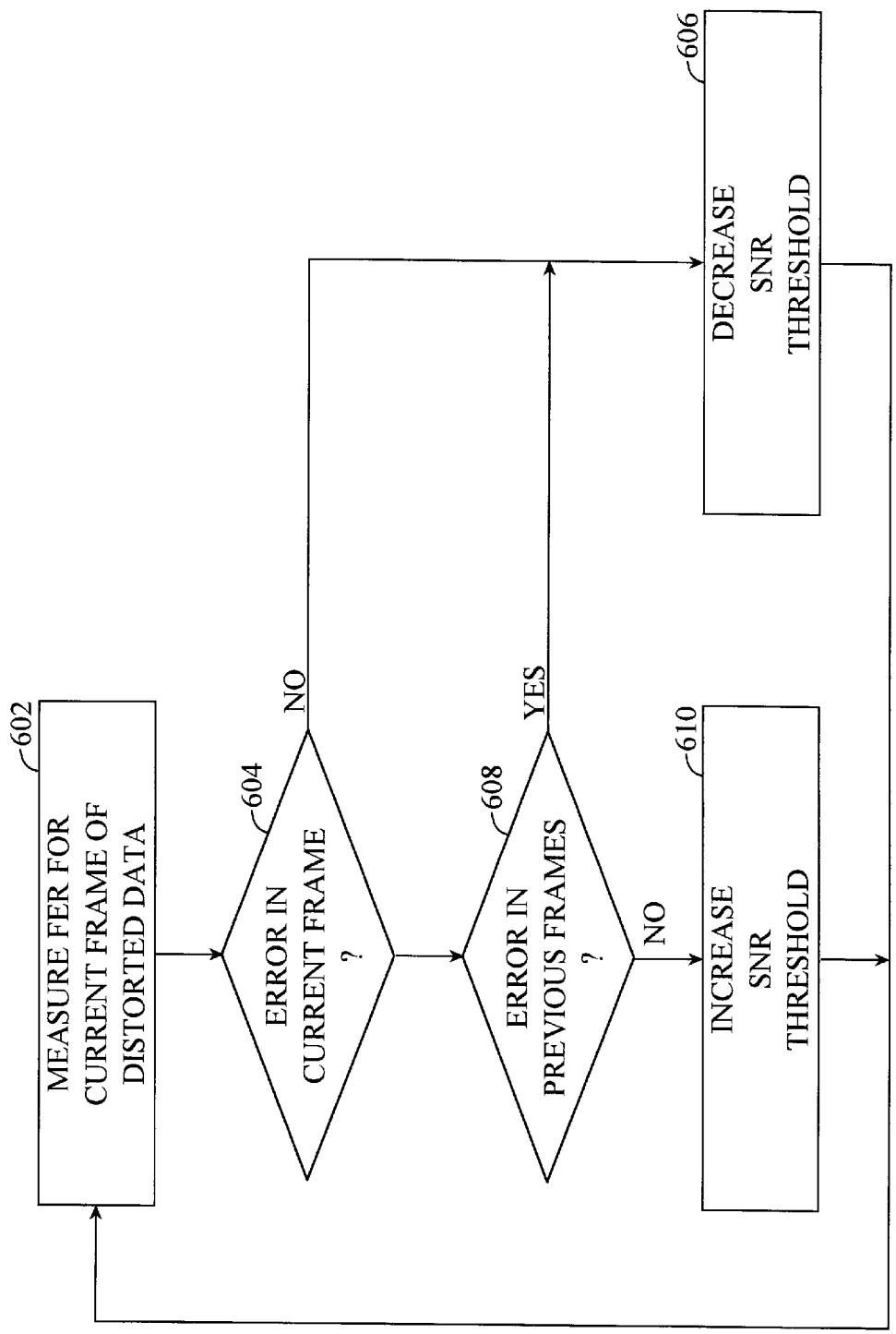
FIG. 6 is a flowchart depicting the operation of an outer power control loop used by a power control determiner in an embodiment of the present invention.

FIGS. 5 and 6 are flowcharts depicting the operation of power command determiner 420, SNR estimator 418, and error detector 416, according to a preferred embodiment of the present invention. FIG. 5 depicts the operation of an inner power control loop. The steps of FIG. 5 are likely to be performed by SNR estimator 418 and power command determiner 420. The function of the inner power control loop is to adjust the signal power transmitted by gateway 122.

In the example embodiments discussed above, the transmitted signal power is adjusted according to the level of signal power received at transceiver 200. More specifically, in these example embodiments, gateway 122 transmits a signal(s) to user terminal 126. The signal is demodulated by demodulator 401 and (preferably) quantized by quantizer 408. The quantized representation of the signal (that is, output 409) is then provided to distorter 412 which outputs a distorted quantized representation of the signal, as discussed above. Output 413 of distorter 412 shall be referred to as distorted demodulated signal 413.

The process begins with the measurement by SNR estimator of the power of distorted signal 413, as shown in step 502. In a preferred embodiment, SNR estimator 418 measures the signal-to-noise ratio (SNR) of distorted signal 413. More specifically, the SNR estimator measures the quantity $E_b/N_o$, where $E_b$ is energy per bit and $N_o$ is noise density in units of power/cycle. Of course, other measures of signal power can be used without departing from the scope of the present invention. In a preferred embodiment, SNR is measured for every frame of received data.

In communication system 100, a predetermined SNR level, referred to as the "SNR threshold," is associated with transceiver 200. The SNR threshold represents the minimum SNR at which signals should be received by transceiver 200 in order to ensure data quality. The SNR threshold can be selected according to methods that are well-known in the relevant art. One such method is to select a SNR that will keep data errors under a certain percentage, such as one percent. In step 504, power command determiner 420 compares the SNR measured in step 502 to the SNR threshold.

If the measured SNR is lower than the SNR threshold, then power control determiner 420 generates an "increase power" command which causes a power-up message to be transmitted to gateway 122, as shown in step 506. In response, gateway 122 increases the transmitted signal power by a predetermined amount (for example, 0.5 dB), referred to as the "gain" of the inner loop, or "inner loop gain."

If the measured SNR exceeds the SNR threshold, then power control determiner 420 of transceiver 200 generates a "decrease power" command which causes a power-down command to be transmitted to gateway 122, as shown in step 508. In response, gateway 122 decreases the signal power by a specific amount (for example, 0.004 dB). In either case, the process resumes at step 502.

As discussed above, where a quality measurement function other than SNR is used that changes in inverse proportion to the power level, such as a technique which measures or relies on the presence of "error events" or error rates, the signal power is adjusted in inverse relationship to the degree by which the measurement varies from the threshold. That is, when the measured value exceeds the threshold the signal power is increased and when it is less than the threshold the signal power is decreased.

FIG. 6 depicts the operation of the outer power control loop (also referred to as the "outer loop") used in an embodiment of the present invention. The steps of FIG. 6 are likely to be performed by error detector 416 and power command determiner 420. The function of the outer power control loop is to adjust the SNR threshold of transceiver 200. In a preferred embodiment, the SNR threshold is adjusted according to the quality of the received signal. In a preferred embodiment, the quality of the signal is considered not only for the current frame, but also for a certain number of previous frames. Also, in a preferred embodiment, the measure of signal quality used is a measured FER. However, other measures of signal quality, such as parity checks, can be used without departing from the scope of the present invention.

Referring to FIG. 6, the process begins with determining whether or not the current frame of distorted data 415 (also referred to as distorted decision data) is in error, as shown in step 602. The process then determines whether errors are present in the current frame, as shown in step 604. If no errors are present in the current frame, as indicated by the "No" branch from step 604, then power command determiner 420 decreases the SNR threshold by a predetermined amount, as shown in step 606. However, if errors are present in the current frame, as indicated by the "Yes" branch from step 604, then the process reviews the quality history of the received signal, as shown in step 608. In a preferred embodiment, the error history comprises a predetermined number of previous frames N. Of course, the error history can be selected in other ways without departing from the scope of the present invention. The error history is preserved in memory (not shown). If any of the previous N frames contain an error, then power command determiner 420 decreases the SNR threshold by the outer loop gain, as shown in step 606.

However, if the previous N frames contain no errors, then power command determiner 420 increases the SNR threshold, as shown in step 610. In a preferred embodiment, two change values are employed: one for decreasing the SNR threshold, and the other for increasing the SNR threshold. The change value for decreasing the SNR threshold is relatively small, so that the SNR threshold, and through the action of the inner loop, the transmitted signal power, is gradually reduced in error-free environments. Conversely, the change value for increasing the SNR threshold is relatively large, so that the SNR threshold, and through the action of the inner loop, the transmitted signal power, is quickly increased in error-prone environments.

The operation of power control determiner 420 discussed in the description of FIGS. 5 and 6 above can be used in the power control schemes of FIGS. 4A and 4B. However, an advantage of using the scheme of FIG. 4B is that the necessary amount of increase in SNR threshold (that is, outer loop gain) in response to a frame error being detected when using the power control scheme of FIG. 4B is less than when using the scheme of FIG. 4A. Additionally, the amount of decrease (step down) in SNR threshold when using the power control scheme of FIG. 4B can be larger than when using the power control scheme of FIG. 4A. Since the total transmission power roughly follows increases and decreases in the SNR threshold, the total transmission power is reduced when using the power control scheme of FIG. 4B.

The power control schemes of FIGS. 4A and 4B are described as if signals are transmitted from gateway 122, via satellite 116, to user terminal 126. That is, the power control schemes of FIGS. 4A and 4B are described as if the components shown in FIGS. 4A and 4B are located in user terminal 126 and the transmission power of gateway 122 is being controlled. It is noted that the same power control schemes can be used if user terminal 126 is receiving signals from base station 112. The only difference is that power command determiner 420 will determine whether or not to adjust the power used by base station 112 to transmit signals to user terminal 126 rather than whether or not to adjust the power used by gateway 122. It is also noted that even though the above discussed power control schemes are described as being used by user terminal 126, relatively identical schemes can be used by gateway 122 or base station 112 to adjust the power that a user terminal 126 uses to transmit signals to gateway 122 or base station 112. That is, for example, the components in FIGS. 4A and 4B can be located in gateway 122 and the transmission power being controlled can be that of user terminal 126 when transmitting a signal (s) to gateway 122, via satellite 118. Additionally, the power control schemes of FIGS. 4A and 4B can be used to adjust the transmission power of user terminal 126 when it is sending a signal(s) to base station 112.

V. High Level Operation of the Present Invention

Figure 7:
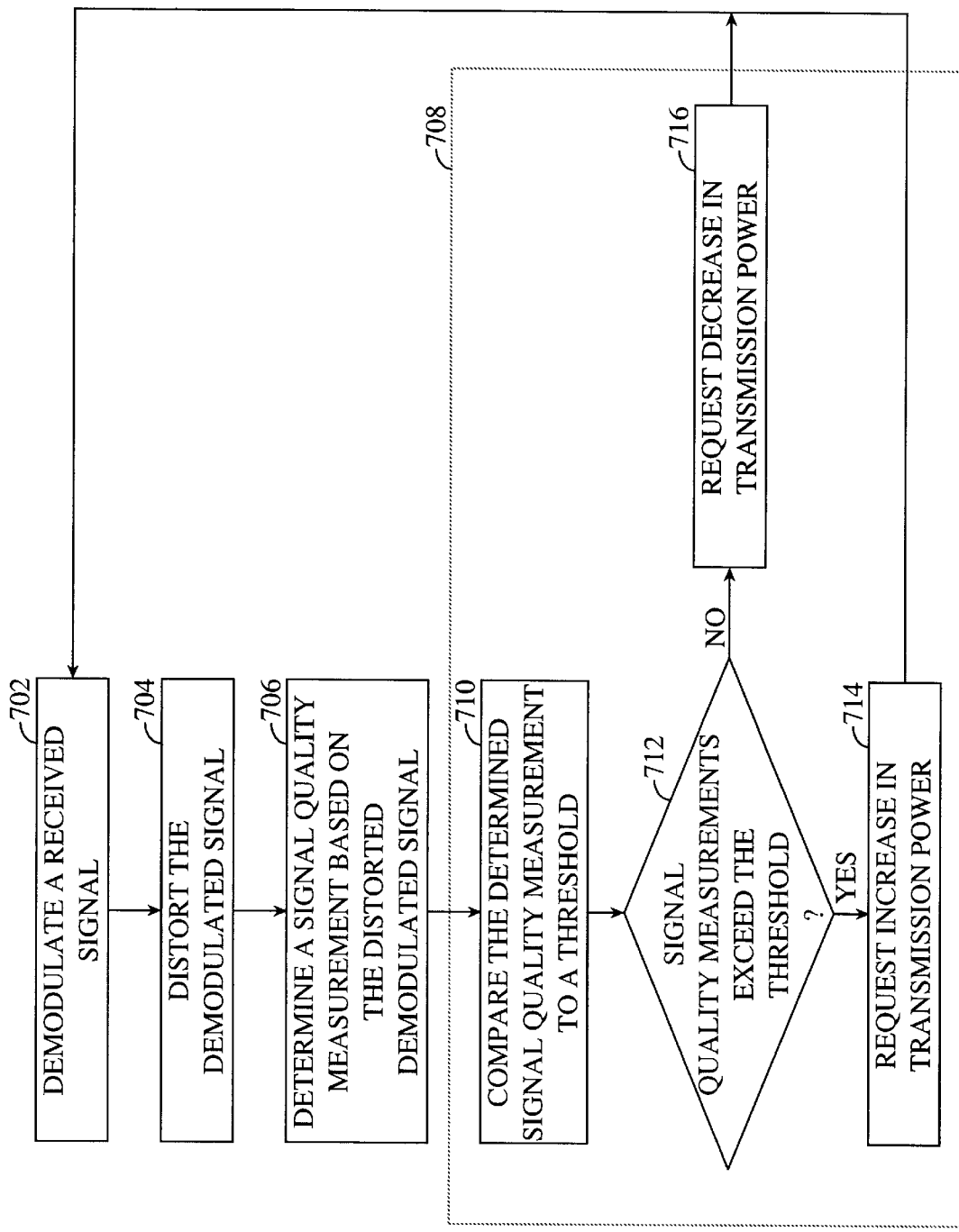
FIG. 7 is a flowchart depicting the high level operation of a preferred embodiment of the present invention.

FIG. 7 is a flowchart depicting the high level operation of a preferred embodiment of the present invention. The process begins with demodulating a received signal, as shown in step 702. The demodulated signal is then distorted in step 704. This may be done, for example, by adding noise to the demodulated signal. Next, in step 706, a signal quality measurement is determined based on the distorted demodulated signal (rather than based on the non-demodulated signal). This signal quality measurement can be, for example, a measure of SNR. Finally, in step 708, an adjustment in transmission power is requested based on the signal quality measurement determined in step 706.

Step 708 can include steps 710, 712, 714 and 716. In step 710, the signal quality measurement determined in step 706 is compared to a threshold. In step 712 a determination is made whether the signal quality measurement exceeds the threshold. If the answer to step 712 is yes, then an increase in transmission power (for example, +0.5 dB) is requested. If the answer to step 714 is no, then a decrease in transmission power (for example, −0.5 dB) is requested.

The threshold used in steps 710 and 712 is preferably adjusted based on a second measurement of signal quality, as discussed above. For example, the distorted demodulated signal can be decoded to produce distorted decision data. A measure of frame errors can then be determined based on the distorted decision data. The threshold used in steps 710 and 712 can then be adjusted based on this measure of frame errors.

For the preferred embodiment, where the thresholds used in steps 710 and 712 are adjusted, it is noted that if user terminal 126 employs the power control scheme of FIG. 4B, then power control determiner 420 will not have to increase its SNR threshold in step 610 by as much as it would have to if user terminal 126 employed the scheme of FIG. 4A. More specifically, assume power adjustments of gateway 122 are based on comparisons to a SNR threshold. If user terminal 126 employs the power control scheme of FIG. 4A to control the signal transmission power of gateway 122, then power command determiner 420 may need to increase its SNR threshold by approximately 3 dB in response to receiving increase SNR threshold command in step 610 in order to ensure that the FER (of non-distorted demodulated signal 409 or 407) does not drop below a threshold FER. In contrast, if the same user terminal 126 (within the same wireless communications system and at the same location) were to use the power control scheme of FIG. 4B, then power command determiner 420 needs less of an increase in its SNR threshold, for example, 0.5 dB, in order to ensure that the actual FER (of non-distorted demodulated signal 409 or 407) does not fall below the FER threshold. The transmitter power of gateway 122 essentially follows changes in SNR threshold. This is because when using the scheme of FIG. 4B, SNR threshold is increased prior to the actual SNR (that is, the SNR of demodulated signal 407 or 409) falling below the SNR threshold. Since the transmitter power of gateway 122 essentially follows the increases and decreases in SNR threshold, this will result in gateway 122 not having to increase its power by as much as it would if user terminal 126 employed the scheme of FIG. 4A. The transmitter power of gateway 122 essentially follows changes in SNR threshold because the power of gateway 122 is based on power-up (for example, +0.5 dB) and power-down (for example, −0.5. dB) requests made by power command determiner 420, which are in turn based on comparisons to the SNR threshold.

Additionally, for the power scheme of FIG. 4A, to ensure that the FER does not drop below the FER threshold, the amount of decrease in SNR threshold in response to a power-down command should be relatively low, for example 0.001 dB. In contrast, SNR threshold can be stepped down more rapidly, for example 0.004 dB, in response to a power-down command when using the power scheme of FIG. 4B. This is because the SNR threshold (and thus gateway transmitter power) is increased before the actual SNR (that is, the SNR of demodulated signal 407 or 409) reaches the SNR threshold.

The example graph of FIG. 8A illustrates the SNR threshold, over time, when user terminal 126 uses the power control scheme of FIG. 4A. As can be seen from FIG. 8A, power control determiner 420 increases SNR threshold at time $t_1$. For this example, power control determiner 420 increases SNR threshold by 3 dB in response to receiving an increase SNR threshold command in step 610. At times prior to time $t_1$, when for example, no frame errors are detected, power control determiner 420 decreases the SNR threshold in step 606. For this example, it is assumed that power control determiner 420 decreases the SNR threshold by 0.001 dB in response to receiving decrease SNR threshold command in step 606. Alternatively, power control determiner may independently reduce its SNR threshold over time until it receives an increase SNR threshold command at time $t_1$.

Still referring to FIG. 8A, since the power that gateway 122 uses to transmit a signal(s) essentially follows the SNR threshold, the area under the saw-tooth like curve is roughly proportional to the total amount of power that gateway 122 uses to transmit a signal(s) to user terminal 126 over a period of time. A purpose of the present invention is to reduce this total amount of power while maintaining a desired signal quality. Accordingly, a reduction of the total power can be illustrated by a reduction in the area under the saw-tooth like curve.

The example graph of FIG. 8B illustrates the SNR threshold, over time, when user terminal 126 uses the power control scheme of FIG. 4B. As can be seen from FIG. 8B, power command determiner 420 increases SNR threshold at times $t_1'$, $t_2'$, $t_3'$, and so forth, when for example a frame error is detected (and has not been detected in N previous frames). The increase in SNR threshold in response to receiving an increase SNR threshold command in step 610 is only 0.5 dB, as compared to 3 dB in FIG. 8A. Additionally, the SNR threshold is stepped down more rapidly in response to a decrease SNR threshold command in step 606, which occurs when a frame error is not detected (for example, at times between $t_1'$ and $t_2'$)

The graphs of FIG. 8A and FIG. 8B are drawn to approximately the same scale. That is, when referring to FIGS. 8A and 8B it can be seen that in response to receiving an increase SNR threshold command, increases in SNR threshold are much greater in FIG. 8A than in FIG. 8B (3 dB as compared to 0.5 dB). Further, in response to receiving a decrease SNR threshold, the SNR threshold is stepped down much less rapidly in FIG. 8A than in FIG. 8B (0.001 dB as compared to 0.004 dB). Accordingly, it can be seen that the slope of the lines representing decreases in SNR threshold in FIG. 8B is approximately four times greater than the slope in FIG. 8A. Since the transmitter power of gateway 122 essentially follows the changes is SNR threshold, these two graphs show that the amount of transmitter power necessary when using the power control scheme of FIG. 4A (which corresponds to the graph in FIG. 8A) is much greater than the amount of transmitter power necessary when using the power control scheme of FIG. 4B (which corresponds to the graph in FIG. 8B). Accordingly, use of the power control scheme of FIG. 4B saves resources and reduces possible signal interference.

An adaptive power control scheme such as discussed above using a double loop configuration relies on both the measurement of SNR and the measurement of errors to determine the application of power-up or power-down commands. In a non-adaptive scheme simply detecting whether the measured SNR is above or below some fixed threshold is sufficient. However, for adaptive techniques the threshold itself must change in accordance with the number of errors detected (the so-called outer loop). While it is quite practical to achieve relatively high FER like 1%, error rates lower by orders of magnitude are impractical. The reason is that in a system operating at high SNR and, therefore, low FER, the absence of errors causes the threshold to be progressively lowered until the SNR is sufficiently low so that too high an FER is achieved and the threshold is then ratcheted- or stepped-up in value again. This causes alternation between periods of super low FER and slow drifting to too high an FER. However, what is desired is steady operation at low FER. If the virtual decoder is implemented to distort the received signal so that both the SNR measurement and the FER are degraded, and the virtual decoder issues power control commands; but at the same time there is a parallel undistorted receiver that is releasing true demodulated/ decoded data; then the virtual decoder can operate at a normal low FER like 1% while the true decoder is operating at a FER that is one or more orders of magnitude lower.

One area where the invention can be used to advantage is in the application of newer coding/decoding techniques (e.g., turbo coding). In these cases, the relationship between SNR vs. BER or FER can be viewed as a curve which has a very steep slope. That is, when the SNR is only a little too high or low it can change the error rate by a more significant amount or by orders of magnitude. It is very difficult to use adaptive (e.g., double loop) power control techniques when such coding is used because such techniques produce some variation in delivered SNR which can result in order of magnitude changes in error rate. The use of the virtual decoder technique disclosed above allows the "virtual decoder" to operate in a non-steep or less steep region of the curve, less impact on error rate, while the actual decoder operates in a steep region at a higher (non-degraded) SNR. Operating the virtual decoder in a non-steep portion, allows keeping the SNR variation small.

Another area where the invention can be used to great advantage is in cases where power control is needed with both very low latency and low frame error rate. Two similar examples are transferring data, either terrestrially or by satellite, for T carrier facilities and for Asynchronous Transfer Mode (ATM) traffic. The T carrier facility can represent a mix of traffic going to/from a customer to/from his service provider where the traffic can be a mix of digitized voice, digital video conferencing, Internet, and file transfer traffic. In such an application, the standard service is for low error rate, and the protocols built into either end assume a low latency. So a radio link providing this type of service must exhibit those same properties to carry the data. For ATM service, it can be argued that the simplest case of voice or video data these services do not really need low error rate because encoding/decoding procedures for such real time services is usually built to withstand a fairly high error rate without the need for retransmission. However, each ATM packet (cell) not only contains payload information or data which can use high error rate, but also address information which needs a low error rate to keep from being lost. Generally, repeating packets is not permitted or possible in real time services. Therefore, using the virtual decoder arrangement disclosed above allows for an improved control over the error rates for such services, with the ability to provide lower frame error rates as appropriate and maintain a low latency as needed.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What I claim as the invention is:

1. A method for controlling a signal transmission power, comprising the steps of:
    (a) demodulating a received signal to produce a demodulated signal;
    (b) distorting said demodulated signal to produce a distorted demodulated signal;
    (c) determining a signal quality measurement based on said distorted demodulated signal which represents a value directly proportional to signal quality;
    (d) requesting an adjustment in the transmission power based on said signal quality measurement comprising:
        (i) comparing said determined signal quality measurement to a preselected threshold value; and
        (ii) requesting an increase in transmission power if said signal quality measurement exceeds said threshold;
    (e) decoding said demodulated signal to produce decision data;
    (f) decoding said distorted demodulated signal to produce distorted decision data;
    (g) determining a second signal quality measurement based on said distorted decision data; and
    (h) adjusting said threshold based on said second signal quality measurement.

2. The method of claim 1, wherein the signal quality measurement represents a value inversely proportional to signal quality and step (d) comprises the steps of:
    (i) comparing said determined signal quality measurement to a pre-selected threshold value; and
    (ii) requesting a decrease in transmission power if said signal quality measurement exceeds said threshold.

3. The method of claim 2, wherein step (d) further comprises the step of:
    (iii) requesting an increase in the transmission power if said signal quality measurement does not exceed said threshold.

4. The method of claim 1, wherein said signal is transmitted by a gateway and received by a user terminal via a satellite, and steps (a)–(d) are performed by the user terminal to control the transmission power at the gateway.

5. The method of claim 1, wherein said signal is transmitted by a base station and received by a user terminal, steps (a)–(d) are performed by the user terminal, and the transmission power at the base station is being controlled.

6. The method of claim 1, wherein said signal is transmitted by a user terminal and received by a gateway via a satellite, and steps (a)–(d) are performed by the gateway to control the transmission power at the user terminal.

7. The method of claim 1, wherein step (d) further comprises the step of:
    (iii) requesting a decrease in the transmission power if said signal quality measurement does not exceed said threshold.

8. The method of claim 1, wherein said demodulated signal comprises soft decision data which reflects a measure of confidence of values of corresponding digits of the transmitted signal.

9. The method of claim 8, wherein step (b) comprises distorting said soft decision data to thereby reduce said measure of confidence.

10. The method of claim 1, wherein said signal is transmitted by a user terminal and received by a base station to control the transmission power at the user terminal.

11. The method of claim 1, wherein step (a) comprises correlating said received signal with a plurality of data values to produce said demodulated signal.

12. The method of claim 11, wherein step (a) further comprises quantizing said demodulated signal to produce a quantized demodulated signal, and wherein step (c) comprises determining said signal quality measurement based on said quantized demodulated signal.

13. The method of claim 1, wherein step (b) comprises adding noise to said demodulated signal to produce said distorted demodulated signal.

14. The method of claim 1, wherein step (c) comprises determining a signal-to-noise ratio of said distorted demodulated signal.

15. The method of claim 14, wherein step (d) comprises requesting said transmission power adjustment based on said signal-to-noise ratio.

16. The method of claim 1, further comprising the step of providing said decision data to digital baseband circuitry.

17. The method of claim 1, wherein said second signal quality measurement comprises a measure of frame error.

18. An apparatus for controlling a signal transmission power, comprising:

a demodulator for demodulating a received signal to produce a demodulated signal;

a decoder for decoding said demodulated signal to produce decision data;

a distorter for distorting said demodulated signal to produce a distorted demodulated signal;

a virtual decoder for decoding said distorted demodulated signal to produce distorted decision data;

a signal quality estimator for determining a first signal quality measurement based on said distorted demodulated signal which represents a value directly proportional to signal quality;

an error detector for determining a second signal quality measurement based on said distorted decision data; and a power command generator for requesting an adjustment in the transmission power based on said first signal quality measurement by comparing it to a threshold and requesting an increase in the transmission power if the first signal quality measurement exceeds said threshold.

19. The apparatus of claim 18, wherein said signal is transmitted by a user terminal and received by a gateway via a satellite, wherein said demodulator, said distorter, said signal quality estimator, and said power command determiner are components of the gateway, and wherein the transmission power at the user terminal is being controlled.

20. The apparatus of claim 18, wherein said signal is transmitted by a gateway and received by a user terminal via a satellite, wherein said demodulator, said distorter, said signal quality estimator, and said power command determiner are components of the user terminal, and wherein the transmission power at the gateway is being controlled.

21. The apparatus of claim 18, wherein said signal is transmitted by a base station and received by a user terminal, wherein said demodulator, said distorter, said signal quality estimator, and said power command generator are components of the user terminal, and wherein the transmission power at the base station is being controlled.

22. The apparatus of claim 18, wherein the signal quality measurement represents a value inversely proportional to signal quality and said power command generator compares said signal quality measurement to a threshold and requests a decrease in the transmission power if said signal quality measurement exceeds said threshold.

23. The apparatus of claim 22, wherein said power command generator requests an increase in the transmission power if said signal quality measurement does not exceed said threshold.

24. The apparatus of claim 18, wherein said power command generator requests a decrease in the transmission power if said first signal quality measurement does not exceed said threshold.

25. The apparatus of claim 18, wherein said demodulator comprises a correlator for correlating said received signal with a plurality of data values to produce said demodulated signal.

26. The apparatus of claim 25, further comprising a quantizer for quantizing the output of said correlator to produce a quantized demodulated signal and wherein said signal quality estimator determines said signal quality measurement based on said quantized demodulated signal.

27. The apparatus of claim 18, wherein said demodulated signal comprises soft decision data which reflects a measure of confidence of values of corresponding digits of the transmitted signal.

28. The apparatus of claim 27, wherein said distorter distorts said soft decision data to thereby reduce said measure of confidence.

29. The apparatus of claim 18, wherein said signal is transmitted by a user terminal and received by a base station, and the transmission power at the user terminal is being controlled.

30. The apparatus of claim 18, wherein said second signal quality measurement determined by said error detector is a measure of frame error.

31. The apparatus of claim 18, further comprising means for adjusting said threshold based on said second signal quality measurement.

32. The apparatus of claim 18, wherein said signal quality measurement comprises signal-to-noise ratio.

33. The apparatus of claim 32, wherein said power command determiner requests said adjustment based on said signal-to-noise ratio.

34. The apparatus of claim 18, wherein said decision data is provided to digital baseband circuitry.

35. The apparatus of claim 18, wherein said distorter adds noise to said demodulated signal.

* * * * *